United States Patent [19]

Kordosky et al.

[11] Patent Number: 4,544,532
[45] Date of Patent: * Oct. 1, 1985

[54] SOLVENT EXTRACTION

[75] Inventors: Gary A. Kordosky; R. Brantley Sudderth; J. Michael Sierakoski, all of Tucson, Ariz.; Kenneth D. MacKay, Plymouth, Minn.

[73] Assignee: Henkel Corporation, Minneapolis, Minn.

[*] Notice: The portion of the term of this patent subsequent to Mar. 26, 2002 has been disclaimed.

[21] Appl. No.: 660,592

[22] Filed: Oct. 15, 1984

Related U.S. Application Data

[63] Continuation-in-part of Ser. No. 592,828, Mar. 23, 1984, , which is a continuation-in-part of Ser. No. 500,041, Jun. 7, 1983, abandoned, which is a continuation-in-part of Ser. No. 340,991, Jan. 25, 1982, abandoned.

[51] Int. Cl.$^4$ ................................................ C01G 3/00
[52] U.S. Cl. .............................. 423/24; 423/DIG. 14; 252/182; 75/117; 75/101 BE
[58] Field of Search ......................... 423/24, DIG. 14; 252/182; 75/117, 101 BE

[56] References Cited

U.S. PATENT DOCUMENTS

4,142,952 3/1979 Dalton .................................. 423/24
4,173,616 11/1979 Koenders ............................. 423/24

FOREIGN PATENT DOCUMENTS

1083828 8/1980 Canada ................................. 423/24

OTHER PUBLICATIONS

Whewell, Degradation In Hydroxyoxime Solvent Extraction Systems, *Hydrometallurgy*, (Jun. 1981), vol. 7, pp. 7-26.
*Dissertation Abstracts International*, vol. 41, No. 11, May 1981, p. 4233B.
Tumilty, *Adv. In Extractive Metallurgy*, 1977, Inst. of Mining and Metallurgy, (1977), pp. 123-131, (London).
C.I.M. Special vol. 21, (Proc. 1, SEC 77) Can. Inst. of Mining and Met., (1979), pp. 17-23, 40-48, 185-186, 542-551.
Hanson, J. of Inorganic Nucl. Chem., (1976), vol. 38, pp. 2306-2307.

*Primary Examiner*—John Doll
*Assistant Examiner*—Robert L. Stoll
*Attorney, Agent, or Firm*—Ernest G. Szoke; Patrick J. Span

[57] ABSTRACT

Reagents formulated by admixture of selected hydroxy aryl ketoxime and hydroxy aryl aldoxime extractants provide for efficient recovery of metal values, especially copper values, by solvent extraction processes. Specified kinetic and equilibrium conditions, which would require use of predetermined quantities of kinetic additives if ketoximes alone were employed or predetermined quantities of equilibrium modifiers if aldoximes were employed, are secured through formulation of reagents including both ketoxime and aldoxime extractants with less than the predetermined quantities of kinetic additive or equilibrium modifier. Reagents employed in methods of the invention may include from 0 to about 20 mole percent of a kinetic additive based on ketoxime content and also optionally a modifier of extraction and stripping equilibria in an amount providing a degree of modification of the aldoxime constituent of from about 0.75 to 1.0 and preferably from about 0.90 to 1.0.

7 Claims, No Drawings

SOLVENT EXTRACTION

This is a continuation-in-part application of co-pending application Ser. No. 592,828, filed Mar. 23, 1984, which is a continuation-in-part of Ser. No. 500,041, filed June 7, 1983, and which is a continuation-in-part of Ser. No. 340,991, filed Jan. 25, 1982.

BACKGROUND

The present invention relates generally to solvent extraction processes for recovery of metal values from aqueous solutions and, more particularly, to formulative procedures for developing improved solvent extraction reagents and to the use of such reagents in recovery of, e.g., copper values.

The starting material for large scale solvent extraction processing of copper is an aqueous leach solution obtained from a body of ore which contains a mixture of metals in addition to copper. The leaching medium dissolves salts of copper and other metals as it trickles through the ore, to provide an aqueous solution of the mixture of metal values. The metal values are usually leached with sulfuric acid medium, providing an acidic aqueous solution, but can also be leached by ammonia to provide a basic aqueous solution.

The aqueous solution is mixed in tanks with an extraction reagent which is dissolved in an organic solvent, e.g., a kerosene. The reagent includes an extractant chemical which selectively forms a metal-extractant complex with the copper ions in preference to ions of other metals. The step of forming the complex is called the extraction or loading stage of the solvent extraction process.

The outlet of the mixer continuously feeds to a large settling tank, where the organic solvent (organic phase), now containing the copper-extractant complex in solution, is separated from the depleted aqueous solution (aqueous phase). This part of the process is called phase separation. Usually, the process of extraction is repeated through two or more mixer-settler stages, in order to more completely extract the desired metal.

After extraction, the depleted aqueous feedstock (raffinate) is either discharged or recirculated to the ore body for further leaching. The loaded organic phase containing the dissolved copper-extractant complex is fed to another set of mixer tanks, where it is mixed with an aqueous strip solution of concentrated sulfuric acid. The highly acid strip solution breaks apart the copper-extractant complex and permits the purified and concentrated copper to pass to the strip aqueous phase. As in the extraction process described above, the mixture is fed to another settler tank for phase separation. This process of breaking the copper-extractant complex is called the stripping stage, and the stripping operation is repeated through two or more mixer-settler stages to more completely strip the copper from the organic phase.

From the stripping settler tank, the regenerated striped organic phase is recycled to the extraction mixers to begin extraction again, and the strip aqueous phase is customarily fed to an electrowinning tankhouse, where the copper metal value are deposited on plates by a process of electrodeposition. After electrowinning the copper values from the aqueous solution, the solution, known as spent electrolyte, is returned to the stripping mixers to begin stripping again.

Many reagent formulations have been proposed for use in recovery of copper by solvent extraction in the prior art. See, e.g., Flett, D. S., "Solvent Extraction in Hydrometallurgy", *Chemistry and Industry*, No. 17, Sept. 3, 1977, pp. 706–712.

Reagents frequently employed in commercial processes for copper recovery are included among those offered by Henkel Corporation under the LIX$^R$ trademark, viz., LIX$^R$63, LIX$^R$65N, LIX$^R$64, LIX$^R$64N, LIX$^R$70, LIX$^R$71, LIX$^R$73, LIX$^R$34, LIX$^R$54, LIX$^R$605, LIX$^R$617, LIX$^R$622 AND LIX$^R$6022.

Briefly noted, LIX$^R$63 includes, in addition to a liquid hydrocarbon diluent, an aliphatic alpha-hydroxy oxime extractant (5,8-diethyl-7-hydroxy-dodecan-6-oxime) of the type illustrated in Swanson U.S. Pat. No. 3,224,873. LIX$^R$65N includes an alkyl substituted hydroxy benzophenone oxime (2-hydroxy-5-nonyl benzophenone oxime) as set out in Swanson U.S. Pat. No. 3,592,775; while LIX$^R$64 and 64N incorporate benzophenone oxime extractants (2-hydroxy-5-dodecyl benzophenone oxime and 2-hydroxy-5-nonyl benzophenone oxime, respectively) in combination with an aliphatic alpha-hydroxy oxime as described in U.S. Pat. No. 3,423,449. Formulation of LIX$^R$70 involves combination of a benzophenone oxime extractant containing an electron withdrawing substituent (2-hydroxy-3-chloro-5-nonyl benzophenone oxime) with an aliphatic alpha-hydroxy oxime. LIX$^R$71 and LIX$^R$73 formulations both include a mixture of two benzophenone oximes, one of which has an electron withdrawing sustituent (i.e., a mixture of 2-hydroxy-5-nonyl benzophenone oxime and 2-hydroxy-3-chloro-5-nonyl benzophenone oxime) with the latter reagent further including an aliphatic alpha-hydroxy oxime.

LIX$^R$34 and LIX$^R$54 incorporate alkaryl sulfonamido quinoline and beta-diketone extractants, respectively. LIX$^R$605, LIX$^R$617, LIX$^R$622, and LIX$^R$6022, on the other hand, employ alkyl substituted hydroxy benzaldoxime (salicylaldoxime) extractants according to Parrish, *J. South African Chem. Inst.*, 23, pp. 129–135 (1970). Thus, LIX$^R$605 and LIX$^R$617 include 2-hydroxy-5-nonyl benzaldoxime extractants with, respectively, nonylphenol and tridecanol additives. LIX$^R$622 and LIX$^R$6022 comprise formulations of 2-hydroxy-5-dodecyl benzaldoxime and a tridecanol additive in approximately 4:1 and 1:1 w/w ratios, respectively. Acorga PT-5050 is offered for sale by Acorga, Ltd., Hamilton, Bermuda as a formulation comprising 2-hydroxy-5-nonyl benzaldoxime and a tridecanol additive in an approximately 2:1 w/w ratio. (See also, Ackerley, et al., U.S. Pat. No. 4,020,105; Ackerley et al., U.S. Pat. No. 4,020,106; and Dalton, U.S. Pat. No. 4,142,952).

Other reagents offered for commercial use in copper recovery by solvent extraction have included extractants of the hydroxy phenyl benzyl ketone oxime type (e.g., 2-hydroxy-5-nonyl phenyl benzyl ketoxime as illustrated in Anderson, U.S. Pat. No. 4,029,704, and offered for sale as P-17 by Acorga, Ltd.) and the hydroxy phenyl alkyl ketone oxime type (e.g., 2-hydroxy-5-nonyl phenyl methyl ketone oxime as described in U.K. Pat. No. 2,322,532 and offered for sale as SME 529 and SME 530 by Shell Chemical Company). SME 529 and SME 530 differ in that the latter contains an alpha-beta-dioxime additive.

Also offered for commercial use in copper recovery are the Kelex 100 and Kelex 120 reagents of Ashland Chemical Company, which have included an hydroxy quinoline extractant (7-[3-(5,5,7,7-tetramethyl-1-octenyl)]-8-hydroxyquinoline as described in Buddie, et al., U.S. Pat. No. 3,637,711), either with a nonylphenol additive (Kelex 120 as described in Hartlage, U.S. Pat. No. 3,725,046) or without the phenolic additive (Kelex 100).

As may be noted from the above formulations, it is frequently the case that additive chemicals are included in commercial copper extraction reagents. Principal among the additives incorporated in the reagents are (1) kinetic additives, and (2) modifiers of extraction and stripping equilibria. The kinetic additives (frequently referred to as "accelerators", "catalysts", "kinetic catalysts" or "kinetic synergists") may be defined as chemical substances included in solvent extraction reagents for the purpose of increasing the rate of transfer of metal values between organic and aqueous phases without materially affecting the position of equilibrium. Kinetic additives function to alter transfer rates in a variety of ways which are as yet far from completely understood. Reagent formulations such as LIX$^R$64N incorporate a major proportion of benzophenone oxime and a minor proportion of an aliphatic alpha-hydroxy oxime with the result that the rate of extraction for the reagent under specified conditions may be significantly greater than that of the benzophenone oxime alone.

Modifiers of extraction and stripping equilibria are frequently incorporated in those commercial reagent formulations which include the so-called "strong" extractants. Such extractants are capable of forming a very stable complex association with copper at quite low pH's and, consequently, require the use of very highly acidic aqueous stripping solutions in order to effect the breakdown of the copper-extractant complex. Where extreme acidity of stripping solutions generates problems in employing conventional electrodeposition processes, modifiers are incorporated to shift equilibria in a manner facilitating stripping at lower acidities and to enhance metal extraction efficiency. A wide variety of modifier chemicals has been proposed for use in formulation of solvent extraction reagents for copper. These have included: long chain ($C_6$ to $C_{20}$) aliphatic alcohols such as isodecanol, 2-ethylhexanol, and tridecanol; long chain alkyl phenols such as nonylphenol (see, e.g., Hartlage, U.S. Pat. No. 3,725,046); and various organophosphorous compounds such as tributylphosphate (see, e.g., Ritcey, et al., *Transactions of the International Solvent Extraction Conference*, 1974, pp. 2437–2481). Equilibrium modifiers most frequently employed in commercial reagents include nonylphenol (e.g., Kelex 120, LIX$^R$605) and tridecanol (e.g., LIX$^R$617, LIX$^R$622, LIX$^R$6022, PT-5050).

The use of kinetic additives and equilibrium modifiers has not been without drawbacks in the overall efficiency of solvent extraction processes in terms of the long range stability of reagents and the sensitivity of reagents to contaminants in aqueous feedstocks. As an example, while the minor proportion of kinetic additive present with the hydroxyl aryl ketoxime extractant in the LIX$^R$64N reagent formulation provides for kinetic enhancement in the use of the ketoxime, the additive is less stable toward hydrolytic degradation than the ketoxime. When used under operating conditions which are optimal for ketoxime extractant efficiency, the aliphatic alpha-hydroxy oxime thus tends to be depleted from continuous systems more rapidly than the ketoxime. Similarly, hydroxyl aryl aldoxime extractants are less stable in use than ketoximes and are rendered even more unstable by the presence of large quantities of nonylphenol or other alcoholic modifiers. Alkyl phenol equilibrium modifiers, when entrained in aqueous phases, have been noted to have severe deleterious effects on structural components of solvent extraction facilities such as rubber linings, fittings, valves and the like. Finally, leach solutions containing dissolved silica frequency tend to form emulsions with active metal extractants and their diluents and the sensitivity of reagents to silica has been noted to be enhanced by the presence of equilibrium modifiers. With regard to the last-mentioned factor, it has frequently been noted (if not experimentally quantified) that kinetic and equilibrium modifying additives appear to have adverse effects on solvent extraction systems in terms of what is commonly referred to as "crud formation". Briefly put, solvent extraction systems used to treat agitation leach solutions and colloidal silica-containing leach solutions frequently displays a build-up of semi-solid materials at the organic-aqueous interface. This "crud", if allowed to build uncontrollably, will eventually interfere with the solvent extraction process by decreasing the effective settler area, or in some cases will begin to pass from the settler to the next mixer and in the process cause significant cross-contamination problems. The build-up of crud is normally controlled by mechanical means which may involve a shutdown of the plant and subsequent loss of production.

On the whole, therefore, reagents which include minimal quantities of kinetic additives and/or equilibrium modifiers (or none of these additives at all) are among the most preferred and sought-after for commercial use in recovery of copper.

Of interest to the background of the present invention are those prior patents and publications which disclose reagent formulations which are kinetic additive and/or equilibrium modifier free.

Ashbrook, et al., U.S. Pat. No. 3,455,680 states that superior copper extraction results are obtained through use of assertedly synergistic combinations of aliphatic alphahydroxy oxime extractants and organophosphoric acid extractants. More particularly, the mixture of the two "weak" extractants, which ordinarily form stable copper-extractant complexes at relatively high acid pH's, is said to provide for more efficient extraction at lower pH levels than can be obtained with either extractant alone with the apparent elimination of the need for equilibrium modification. German Offenlegungsschrift No. 2,407,200, states that mixtures of two or more hydroxyphenyl alkyl ketoximes (of the type disclosed in the previously-noted U.K. Pat. No. 1,322,532) are distinguished by greatly improved extraction kinetics over the individual components and the apparent elimination of the need for use of kinetic additives. U.K. No. 1,537,828 asserts that synergistic kinetic effects attend incorporation of hydrocarbyl hydroxymethyl ketone oximes in reagent formulations including 2-hydroxy phenyl alkyl ketone oximes and/or 2-hydroxy phenyl aldoximes and/or 2-hydroxy benzophenone oximes. See also Canadian Pat. No. 1,083,828.

By and large, the literature has been less encouraging in its proposals for any enhanced effects resulting from the admixture of extractants with consequent decrease in relative content or elimination of kinetic additives or equilibrium modifiers.

In published evaluations of the LIX$^R$71 and LIX$^4$73 reagents (which, as noted above, comprise equimolar mixtures of a "strong", chlorine-substituted hydroxy benzophenone oxime with a relatively "weaker" benzophenone oxime not having an electron-withdrawing substituent), no kinetic or equilibrium shifting efficiencies in solvent extraction processing were noted. Properties of the mixed-extractant reagent were noted to be simply intermediate to those of the individual components. See Agers, et al., TMS Paper No. A72-87, The Metallurgical Society of AIME, New York, N.Y. (1972). In discussion of combinations of beta-diketone extractants for copper and other metals, Marcus, et al., noted that most combinations provide no marked synergistic effects and maintained that this is in keeping with a prior hypothesis of synergistic effects only in the combination of one strong and one weak beta-diketone extractant. [See "Ion Exchange and Solvent Extraction of Metal Complexes", pp. 853–854, Wiley-Interscience, London (1969)]. The hypothesis is apparently inconsistent with the synergistic results assertedly obtained by admixture of equal strength hydroxy phenyl alkyl ketoximes in German Offenlegungsschrift No. 2,407,200 (kinetic enhancement) or admixture of two weak extractants in Ashbrook, et al., U.S. Pat. No. 3,455,680 (equilibrium shifting).

An evaluation of mixtures of LIX$^R$34 (containing a quinoline extractant and no kinetic additive or equilibrium modifier) with LIX$^R$64N (containing an hydroxy aryl ketoxime with an aliphatic alpha-hydroxy oxime kinetic additive) was provided by Kordosky in CIM Special Volume 21, pp. 486–495 (1979) and the mixture of extractants was noted to be apparently weaker in extractive power than either of the components individually. In *Dissertation Abstracts International*, Vol. 41, No. 11, p. 4233, May 1981, Valdes reports that mixtures of LIX$^R$64N and SME 529 (containing an hydroxy phenyl alkyl ketoxime and no kinetic additive) were completely compatible but that no synergistic effects were noted.

Reagent mixtures of ketoxime and aldoxime extractants have been evaluated in contexts independent of their kinetic and equilibrium properties. As an example, Hanson, et al. [AIME Pre-Print No. 80-93 (February 24-28, 1980)] reported on the comparative hydrolytic stability of, inter alia, mixtures of commercial reagents including LIX$^R$63, LIX$^R$65N, SME 529 and P5100. The results and conclusions of this work were expanded upon by Whewall, et al., in *Hydrometallurgy*, Vol. 7, pp. 7-26 (1981). Briefly summarized, 50:50 volume percent mixtures of reagents were tested for their ultimate load characteristics under degradative conditions specifically noted to be far removed from commercial plant operating conditions and not providing a suitable basis for commercial choice of one or the other oxime. Some reagent mixtures were reported to exhibit apparent "interactions" providing increased degradation of one or both oxime components (e.g., LIX$^R$63 mixed with P5100 and SME 529 mixed with P5100) while other mixtures displayed no appreciable differences in degradation properties when compared to unmixed individual components (e.g., LIX$^R$65 mixed with P5100). Thus, while mixtures of certain oximes at times exhibited diminished hydrolytic stability under the test conditions, none of the mixtures showed statistically significant stability advantages over individual constituents and none of the mixtures were noted to display any favorable kinetic or equilibrium properties in comparison to individual constituents.

Finally, Tumilty, et al., [*Adv. in Extraction Metallurgy Int'l. Symp.*, 3rd, pp. 123-131, 1977 (London)] reported the properties of a reagent series comprising an alkyl substituted hydroxy benzaldoxime extractant and varying quantities of a nonylphenol equilibrium modifier. The report cites experiment studies relating to a proposed plant changeover from a "present generation [LIX$^R$64N] oxime" to a benzaldoxime reagent having a 3:1 nonylphenol/oxime weight ratio (Acorga P-5300). The studies indicated that over the course of the gradual replacement of LIX$^R$64N with the "strong" extractant-containing P-5300, there was a gradual and essentially linear progression in stripped solvent copper level and stage efficiencies from the levels and efficiencies of the original reagent until 100 percent replacement with the substitute was attained. These results substantially mirrored those reported in Ritcey, et al., *CIM Bulletin*, February, 1974, pp. 87–92, wherein mixtures of a "strong", 8-hydroxyquinoline extractant (Kelex 100) and LIX$^R$64N were noted to be compatible, but not to display either synergism or antagonism.

There continues to exist, therefore, a general need in the art for reagents for solvent extraction processes for the recovery of copper values which display efficient kinetic and equilibrium characteristics but which include diminished quantities of kinetic additives and/or equilibrium modifiers.

BRIEF SUMMARY

The present invention provides novel reagents for recovery of metal values, especially copper values, by solvent extraction processing, which reagents generally comprise mixtures of hydroxy aryl ketoxime and hydroxy aryl aldoxime extractants. Efficient copper recovery is achieved by these reagents despite diminished kinetic additive and/or equilibrium modifier content and even under circumstances wherein these additives are completely eliminated.

The present invention relates, in one of its aspects, to novel procedures for formulating a reagent composition for use in a continuous solvent extraction process for the recovery of copper values under specified equilibrium conditions wherein the use alone of one or more selected hydroxy aryl aldoxime extractants (i.e., selected from among those of Formula III, infra) would require addition of a predetermined molar quantity of one or more extraction and stripping equilibrium modifiers. The novel procedures comprised formulating the reagent composition by (a) incorporating both the selected one or more aldoxime extractants and one or more selected hydroxy aryl ketoxime extractants (i.e., selected from among those of Formulas I and II, infra) in a mole ratio of from 1:100 to 100:1, and (b) incorporating less than the predetermined molar quantity of equilibrium modifier, thereby allowing the specified equilibrium conditions to be obtained in the presence of less than the predetermined molar quantity of equilibrium modifier.

In another of its aspects, the present invention provides improved procedures for formulating a reagent composition for use in a continuous solvent extraction process for the recovery of copper values under specified kinetic conditions wherein the use of one or more selected hydroxy aryl ketoxime extractants alone would require addition of a predetermined molar quantity of kinetic additive substance to secure the specified kinetic conditions. The novel procedures comprise formulating the reagent composition by (a) incorporating both the one or more selected ketoxime extractants and one or more selected hydroxy aryl aldoxime extractants in a mole ratio of from 1:100 to 100:1, and (b) incorporating less than the predetermined molar quantity of kinetic additive, thereby allowing the specified kinetic conditions to be obtained in the presence of less than the predetermined molar quantity of kinetic additive.

In still another of its aspects, the present invention is seen to provide improved methods for formulating a reagent composition for use in a continuous solvent extraction process for the recovery of copper values under specified conditions of equilibrium and kinetics wherein (1) the use of one or more selected hydroxy aryl ketoxime extractants alone would require addition of a predetermined molar quantity of kinetic additive substance to secure the specified kinetic condition, or (2) the use of one or more selected hydroxy aryl aldoxime extractants alone would require addition of a predetermined molar quantity of one or more extraction and stripping equilibrium modifier substances to secure the specified equilibrium conditions. The improved methods of the invention comprise formulating the reagent composition by (a) incorporating both the one or more selected ketoxime extractants and the one or more selected aldoxime extractants in a mole ratio of from 1:100 to 100:1, and (b) incorporating less than the predetermined molar quantities of kinetic additive and equilibrium modifier substances, whereby the specified kinetic and equilibrium conditions are obtained in the presence of less than the predetermined molar quantities of kinetic additive and equilibrium modifier substances.

Hydroxy aryl ketoxime extractants useful in formulation of reagents of the invention are those formulas I and II:

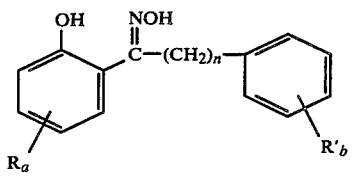

in which R and R' may be individually alike or different and are saturated aliphatic groups of 1 to 25 carbon atoms, ethylenically unsaturated aliphatic groups of 3 to 25 carbon atoms, or -OR" where R" is a saturated or ethylenically unsaturated aliphatic group as defined; n is 0 or 1; and a and b are each 0, 1, 2, 3, or 4, with the proviso that both are not 0 and the total number of carbon atoms in $R_a$ and $R'_b$ is from 3 to 25,

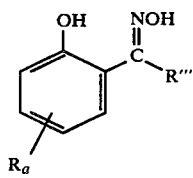

in which R and a are as defined with respect to Formula I and R''' is a saturated aliphatic group of 1 to 25 carbon atoms or an ethylenically unsaturated aliphatic group of 3 to 25 carbon atoms, with the proviso that the total number of carbon atoms in $R_a$ and R''' is from 3 to 25.

Preferred compounds of Formula I are those wherein a is 1, b is 0, R is a straight or branched chain alkyl group having from 7 to 12 carbon atoms, and wherein R is attached in a position para to the hydroxy group. Among these, the more preferred are those wherein R is a mixture of isomers. Preferred compounds of Formula I are those wherein R''' is methyl and R and a are as designated as being preferred for compounds of Formula I. Compounds of Formulas I and II which are especially useful in practice of the invention include: 2-hydroxy-5-nonyl benzophenone oxime; 2-hydroxy-5-dodecyl benzophenone oxime; 2-hydroxy-5-nonyl phenyl benzyl ketone oxime; and 2-hydroxy-5-nonyl phenyl methyl ketone oxime.

Hydroxy aryl aldoxime extractants useful in formulation of reagents of the invention are those of Formula III:

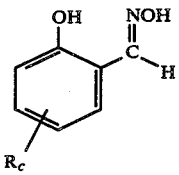

in which R is as defined above with respect to Formulas I and II, c has a value of 1, 2, 3, or 4, and the total number of carbon atoms in $R_c$ is from 3 to 25. Preferred compounds of Formula III are those wherein c is 1, R is a straight or branched chain alkyl group having from 7 to 12 carbon atoms, and wherein R is attached in a position para to the hydroxyl group. Among these, the more preferred are those wherein R is a mixture of isomers. Compounds of Formula III which are especially useful in practice of the invention include 2-hydroxy-5-heptyl benzaldoxime, 2-hydroxy-5-octyl benzaldoxime, 2-hydroxy-5-nonyl benzaldoxime and 2-hydroxy-5-dodecyl benzaldoxime.

Reagents of the invention comprise mixtures of one or more ketoximes of Formula I and II with one or more aldoximes of Formula III in molar ratios ranging from 1:100 to 100:1 and preferably from 1:4 to 4:1 with good results being obtained at ratios of 1:1. Kinetic additive substances may be present in amounts ranging from 0 to 20 mole percent based on ketoxime content and preferably about 5 mole percent. Preferred kinetic additives include alpha-hydroxy oximes described in Swanson, U.S. Pat. No. 3,224,873 and alpha-beta-dioximes described in Koenders, et al., U.S. Pat. No. 4,173,616. Equilibrium modifiers may be present in amounts providing a degree of modification of the aldoxime component of from about 0.75 to 1.0 and preferably about 0.9 to 1.0. Preferred equilibrium modifier chemicals include aliphatic alcohols such as tridecanol, alkyl phenols such as nonylphenol and organophosphorous compounds such as tributyl phosphate. Reagent formulations may optionally include a diluent substance.

Processes of the invention involve use of the reagents as above-described in the recovery of metal values, especially copper values from aqueous solutions by solvent extraction processing.

Aspects and advantages of the present invention will be apparent to those skilled in the art upon consideration of the following detailed description thereof.

DETAILED DESCRIPTION

According to the present invention, reagents useful in the recovery of metal values, especially copper values from aqueous solutions, are formulated to include one or more selected hydroxy aryl ketoxime extractants in combination with one or more selected hydroxy aryl aldoxime extractants.

Hydroxy aryl ketoxime extractants employed in the practice of the invention are those of Formulas I and II below:

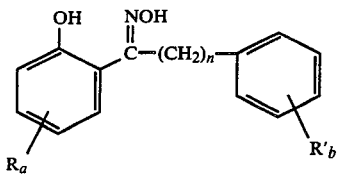

in which R and R' may be individually alike or different and are saturated aliphatic groups of 1 to 25 carbon atoms, ethylenically unsaturated aliphatic groups of 3 to 25 carbon atoms or —OR" where R" is a saturated or ethylenically unsaturated aliphatic group as defined; n is 0 or 1; and a and b are each 0, 1, 2, 3, or 4, with the proviso that both are not 0 and the total number of carbon atoms in $R_a$ and $R'_b$ is from 3 to 25,

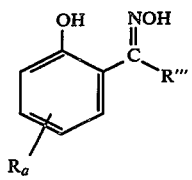

in which R and a are as defined with respect to Formula I and R''' is a saturated aliphatic group of 1 to 25 carbon atoms or an ethylenically unsaturated aliphatic group of 3 to 25 carbon atoms, with the proviso that the total number of carbon atoms in $R_a$ and R''' is from 3 to 25.

Preferred compounds of Formula I are those wherein a is 1, b is 0, R is a straight or branched chain alkyl group having from 7 to 12 carbon atoms, and wherein R is attached in a position para to the hydroxyl group. Among these, the more preferred are those wherein R is a mixture of isomers. Preferred compounds of Formula II are those wherein R''' is a methyl and R and a are as designated as being preferred for compounds of Formula I.

Compounds of Formula I wherein n has a value of 0 (i.e., hydroxy benzophenone oxime compounds) may suitably be prepared according to the methods disclosed in Swanson U.S. Pat. Nos. 3,952,775 and 3,428,449. By reason of ease and economy of synthesis from available starting materials, ready solubility in organic diluents commonly employed in solvent extraction and desirable properties of complexes of the compounds with copper, preferred benzophenone oxime compounds of Formula I include those having a single alkyl ring substituent having from 7 to 12 carbon atoms in a position para to the hydroxyl group, which alkyl substituent is a mixture of isomers. Examples of such compounds are 2-hydroxy-5-nonyl benzophenone oxime and 2-hydroxy-5-dodecyl benzophenone oxime which are obtained as mixtures of alkyl isomeric forms when commercial nonylphenol and dodecyl phenol are respectively employed in their synthesis.

Compounds of Formula I wherein n has a value of 1 (i.e., hydroxy phenol benzyl ketone oxime compounds) may suitably be prepared according to the methods described in Anderson, U.S. Pat. No. 4,029,704. Preferred phenyl benzyl ketone oximes, like the above-noted benzophenone oximes, are those having an isomeric mixture of 7 to 12 carbon alkyl groups as a single substituent on the ring para to the hydroxyl group. These preferred compounds are exemplified by the compound 2-hydroxy-5-nonylphenol benzyl ketone oxime, as manufactured from a commercial nonylphenol comprising a mixture of nonyl isomeric forms.

Compounds of Formula II (i.e., hydroxy phenyl alkyl ketone oxime compounds) may suitably be prepared according to the procedures disclosed in U.K. Pat. No. 1,322,532. As noted with regard to benzophenone oxime and phenyl benzyl ketone oxime compounds of Formula I, preferred phenyl alkyl ketone oxime compounds of Formula II are those having an isomeric mixture of 7 to 12 carbon alkyl groups as a single substituent on the ring para to the hydroxyl group. Also preferred are compounds wherein the R''' alkyl group is methyl. Consequently, illustrative of preferred phenyl alkyl ketone oxime compounds is 2-hydroxy-5-nonyl phenyl methyl ketone oxime manufactured through use of commercial nonylphenol.

Hydroxy aryl aldoxime extractants employed in practice of the invention are those of Formula III:

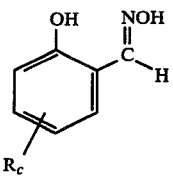

in which R is as defined above with respect to Formulas I and II, c has a value of 1, 2, 3, or 4, and the total number of carbon atoms in $R_c$ is from 3 to 25. Preferred compounds of Formula III are those wherein c is 1, R is a straight or branched chain alkyl group having from 7 to 12 carbon atoms, and wherein R is attached in a position para to the hydroxyl group. Among these, the more preferred are those wherein R is a mixture of isomers.

Compounds of Formula III (i.e., hydroxy benzaldoxime compounds, sometimes referred to as "salicylaldoximes") may suitably be prepared according to the methods described in Ackerley, et al., U.S. Pat. No. 4,020,105, or Ackerley, et al., U.S. Pat. No. 4,020,106 or by oximation of aldehydes prepared according to Beswick, U.S. Pat. No. 4,085,146. Again, preferred compounds are those having an isomeric mixture of 7 to 12 carbon alkyl groups as a single substituent para to the hydroxyl group. Mixed alkyl isomeric forms of 2-hydroxy-5-heptyl benzaldoxime, 2-hydroxy-5-octyl benzaldoxime, 2-hydroxy-5-nonyl benzaldoxime, and 2-hydroxy-5-dodecyl benzaldoxime are thus preferred.

Preparation of the reagents according to the invention involves preparing an admixture of one or more hydroxy aryl ketoxime compounds of Formula I and/or II with one or more hydroxy aryl aldoxime compounds of Formula III in molar ratios of ketoxime to aldoxime ranging from 1:100 to 100:1 and preferably from about 1:4 to about 4:1 with good results being obtained at ratios of 1:1.

Reagents of the invention may optionally include an aliphatic, or aromatic, or mixed aliphatic/aromatic liquid hydrocarbon diluent of the kerosene type commonly employed in solvent extraction processing. Incorporation of a diluent frequently aids the transport and handling of the extractants which may be highly viscous.

According to one aspect of the invention, effective reagents for solvent extraction of copper are prepared which include hydroxy aryl ketoxime extractants but which either do not include kinetic additive substances of the type commonly employed to enhance kinetic characterisitics of such extractants or which include less of such kinetic additives than is ordinarily employed. While reagents of the invention can include as much kinetic additive as is ordinarily employed in combination with an hydroxy aryl ketoxime extractant in commercial copper extraction processes, i.e., up to about 20 mole percent based on ketoxime content, the incorporation of an hydroxy aryl aldoxime extractant in the reagent results in there being a lesser kinetic additive to total active hydroxy aryl oxime ratio than ordinarily present for effective recovery from a given copper-containing aqueous solution. This, in turn, is expected to provide for diminished formulation costs and a lessened disparity in overall rates of hydrolytic degradation among reagent constituents.

Accordingly, kinetic additives may be incorporated in reagent formulations of the invention in amounts ranging from 0 to 20 mole percent based on hydroxy aryl ketoxime content and preferably from about 0 to 5 mole percent. If present at all, as little as 0.01 mole percent may be used. Suitable kinetic additive substances include aliphatic alpha-hydroxy oximes prepared according to Swanson, U.S. Pat. No. 3,224,873, or U.K. Pat. No. 1,537,828 and alpha-beta-dioximes according to Koenders, et al., U.S. Pat. No. 4,173,616. A preferred alpha-hydroxy oxime kinetic additive is 5,8-diethyl-7-hydroxy-dodecan-6-oxime and a preferred dioxime kinetic additive is a mixture of 1-(4'-alkylphenyl)-1,2-propanedione dioximes according to Example 3 of U.S. Pat. No. 4,173,616.

According to another aspect of the invention, effective reagents for solvent extraction of copper are prepared which include hydroxy aryl aldoxime extractants but which either do not include equilibrium modifier substances of the type commonly employed to alter aldoxime extraction and stripping equilibria or which include less of such modifiers than ordinarily employed. While reagents of the invention may include as much equilibrium modifier as has been employed in combination with an hydroxy aryl aldoxime extractant in commercial copper extraction processes, the incorporation of an hydroxy aryl ketoxime extractant in the reagent will result in there being a lesser equilibrium modifier to total active hydroxy aryl oxime ratio than ordinarily present for the effective recovery of copper from a given copper-containing aqueous solution. This is expected to result in diminished acceleration of aldoxime degradation as brought about by reagent modifier chemicals as well as diminished susceptibility to the adverse effects of aqueous feedstock solution contaminants such as dissolved silicates.

Accordingly, equilibrium modifier substances may be incorporated in reagent formulations of the invention in amounts providing a degree of modification of the hydroxyl aryl aldoxime constituent, in the absence of any hydroxy aryl ketoxime, of from about 0.75 to 1.0 and most preferably from about 0.9 to 1.0. Equilibrium modifiers suitable for use in the present invention include: long chain ($C_6$–$C_{20}$) aliphatic alcohols such as n-hexanol, n-octanol, 2-ethylhexanol, isodecanol, dodecanol, tridecanol, hexadecanol, and octadecanol; long chain alkylphenols such as heptylphenol, octylphenol, nonylphenol and dodecylphenol; and organophosphorous compounds such as triloweralkyl ($C_4$ to $C_8$) phosphates, especially, tributyl phosphate and tri(2-ethylhexyl) phosphate.

As employed herein, "degree of modification" designates the inverse ratio of (a) the stripped solvent copper level of an hydroxy aryl aldoxime extractant at equilibrium (expressed in terms of grams per liter of copper) extracted with an aqueous solution containing a fixed concentration of copper and sulfuric acid to (b) the stripped solvent copper level of the same extractant under the same conditions when a selected equilibrium modifier additive is present. Consistent with this definition, the presence of relatively small quantities of an equilibrium modifier will shift the extraction equilibrium slightly, resulting in minor diminution of aldoxime stripped solvent copper level at equilibrium, as will be reflected by a degree of modification of value closely approaching 1.0, e.g., 0.99. Increased effective quantities of modifier under otherwise identical conditions will result in a more pronounced shift in extraction equilibrium and a more pronounced diminution of aldoxime stripped solvent copper level at equilibrium,, as will be reflected by a degree of modification corresponding less than 1.0.

Expectedly, the degree of modification resulting from a given molar ratio of equilibrium modifier to aldoxime in a reagent will vary depending on such factors as the degree of purity of the extractant composition employed in formulation of the reagent, the aromaticity of the solvent, and, perhaps most significantly, the chemical identity of the equilibrium modifier employed. It will also depend significantly on the conditions involved in determination of stripped solvent copper levels. Consequently, for purposes of determining degree of modification of an aldoxime by a given equilibrium modifier, the following test conditions should be adhered to. The temperature at which the determination is made should be about 24° C. The molar concentration of aldoxime (or mixture of aldoximes) in the diluent should be about 0.184 as determined by copper loading and titration and an aldoxime stock of approximately 94 percent purity (with the remainder being substantially alkyl phenol starting material residue) should be employed. The diluent should be Escaid 100 or a mixture of aliphatic and aromatic hydrocarbons closely approximating the constitution of Escaid 100. An atomic absorption methodology should be employed for determining copper content. The composition of the strip solution should be 150 g/l sulfuric acid and 30 g/l $Cu^{+2}$. The foregoing conditions are employed in determining degree of modification according to the invention because they represent conditions closely resembling those commonly extant in commercial solvent extraction facilities for recovery of copper.

Tables I, II, and III below provide an illustrative showing of the degree of modification provided by differing mole ratios of three representative equilibrium modifiers via-a-vis a representative hydroxy aryl aldoxime. More specifically, the Tables provide the results of copper loading determinations of solutions of 2-hydroxy-5-nonyl benzaldoxime extractant alone and with varying quantities of nonylphenol, tridecanol and tributyl phosphate modifier.

Each determination involved use of a reagent solution comprising 2-hydroxy-5-nonyl benzaldoxime dissolved in a kerosene diluent. The stock benzaldoxime employed was preliminarily determined to be 94% pure (by titration) with the remaining stock components principally comprising a nonyl phenol residue from synthesis. The diluent employed was prepared by admixture of 20 volume percent of the highly aromatic kerosene solvent Exxon Aromatic 150 with 80 volume percent of the highly aliphatic kerosene solvent Escaid 200 and thus closely resembled the constitution of the mixed aromatic/aliphatic kerosene solvent, Escaid 100. Solutions were prepared to be 0.184 molar in active aldoxime (corresponding to a concentration of about 48.4 g/l).

A control solution was equilibrated by multiple agitated contacts (at 24° C.) with a strip solution containing 150 g/l sulfuric acid and 30 g/l $Cu^{+2}$ (organic/aqueous volume) ratio, (O/A=1/1). Three separate, three minute contacts with fresh strip solution were performed and the copper content of the resulting organic was determined. Solutions were then prepared including varying quantities of modifier and an identical quantity of aldoxime and tested for stripped solvent copper content under the same conditions. Degree of modification values were determined to three significant figures and rounded off to two figures. The rounded off values are set out in parentheses in the Tables.

TABLE I

| Aldoxime Content grams/liter (Molarity) | Nonylphenol Added grams/liter (Molarity) | Copper Loading Grams/liter | Degree of Modification |
|---|---|---|---|
| 48.4 (0.184) | 0 | 3.16 | 1.000 |
| 48.4 (0.184) | 12.5 (0.057) | 2.84 | 0.898 (0.90) |
| 48.4 (0.184) | 25 (0.114) | 2.56 | 0.810 (0.81) |
| 48.4 (0.184) | 35 (0.159) | 2.39 | 0.756 (0.76) |
| 48.4 (0.184) | 50 (0.227) | 2.10 | 0.664 (0.66) |
| 48.4 (0.184) | 75 (0.341) | 1.76 | 0.556 (0.56) |
| 48.4 (0.184) | 100 (0.454) | 1.53 | 0.484 (0.48) |
| 48.4 (0.184) | 150 (0.682) | 1.15 | 0.364 (0.36) |
| 48.4 (0.184) | 200 (0.909) | 0.91 | 0.288 (0.29) |

The data set out above illustrate that a degree of modification greater than 0.66 for the aldoxime tested is provided by formulation with added nonylphenol at a molar ratio to the oxime of about 1.2:1 and more specifically 1.23:1. Correspondingly greater or lesser ratios of nonylphenol/oxime will provide correspondingly lower or higher degrees of modification. A molar ratio of nonylphenol to aldoxime of 0.86:1 provides a degree of modification of 0.76, while added nonylphenol to aldoxime molar ratios of 0.62:1 and 0.31:1 provide degree of modification values of about 0.81 and 0.90, respectively. It should be noted that the actual quantity of nonylphenol present in each solution tested is somewhat greater (by about 2.9 g/l) than reflected by the quantity added owing to the above-noted residual nonylphenol in the aldoxime stocks employed to make the solutions.

In this regard, it may be noted that P5100, the reagent tested for hydrolytic stability in the previously-noted Hanson, et al. and Whewall, et al. publications is reported to consist of a 1:1 weight ratio mixture of nonylphenol to aldoxime which represents a molar ratio of 1.19:1. Such a reagent would provide a combination of aldoxime and equilibrium modifier wherein the modifier was present in an amount providing a degree of modification of the aldoxime of about 0.66, but significantly less than 0.75 or 0.90.

Table II presents the results of procedures involving addition of a tridecanol modifier to 2-hydroxy-5-nonyl benzaldoxime.

TABLE II

| Aldoxime Content grams/liter (Molarity) | Tridecanol Added grams/liter (Molarity) | Copper Loading Grams/Liter | Degree of Modification |
|---|---|---|---|
| 48.4 (0.184) | 0 | 3.16 | 1.000 |
| 48.4 (0.184) | 4.8 (0.024) | 2.84 | 0.899 (0.90) |
| 48.4 (0.184) | 12.5 (0.625) | 2.33 | 0.739 (0.74) |
| 48.4 (0.184) | 25 (0.125) | 1.75 | 0.554 (0.55) |
| 48.4 (0.184) | 50 (0.250) | 1.05 | 0.332 (0.33) |

The data set out above illustrate that a degree of modification of about 0.75 of the aldoxime tested will be provided by about a 0.34:1 molar ratio of tridecanol to aldoxime and a 0.13:1 ratio of tridecanol to aldoxime will provide a degree of modification of about 0.90. It should again be noted that the total equilibrium modifier present in the above solutions consisted of about 2.9 g/l nonylphenol and the indicated added tridecanol.

Table III presents the results of procedures involving addition of a tributyl phosphate modifier to 2-hydroxy-5-nonyl benzaldoxime.

TABLE III

| Aldoxime Content grams/liter (Molarity) | Tributyl phosphate Added grams/liter (Molarity) | Copper Loading Grams/liter | Degree of Modification |
|---|---|---|---|
| 48.4 (0.184) | 0 | 3.16 | 1.000 |
| 48.4 (0.184) | 2.81 (0.011) | 2.87 | 0.908 (0.91) |
| 48.4 (0.184) | 8.10 (0.031) | 2.38 | 0.753 (0.75) |
| 48.4 (0.184) | 12.5 (0.047) | 1.94 | 0.614 (0.61) |
| 48.4 (0.184) | 25 (0.094) | 1.00 | 0.316 (0.32) |
| 48.4 (0.184) | 40 (0.150) | 0.34 | 0.107 (0.11) |

The data set out above illustrate that a degree of modification of about 0.75 for the aldoxime tested will be provided by about a 0.166:1 molar ratio of tributyl phosphate to aldoxime. A molar ratio of 0.058:1 provides a degree of modification of 0.90. Again, the modifier content of the test solutions should be noted as comprising a mixture of about 2.9 g/l nonylphenol and the indicated added quantities of tributyl phosphate.

It is appropriate to note that aldoxime/modifier mixtures illustrated in Tables I, II and III which have a degree of modification of about 0.75 or more provide copper loadings of 2.3 g/l or higher.

In the event that an aldoxime employed in formulation of reagents of the invention is insufficiently soluble in Escaid 100 diluent to allow preparation of a 0.184 molar solution, a more highly aromatic diluent can be employed to determine the degree of modification. It may be the case that an empirically determined translation factor may appropriately be applied to values determined to obtain degree of modification values corrected for diluent effects, but this has not been the case in the procedures performed to date. When, for example, procedures resulting in the data in Table I were repeated using Exxon Aromatic 150 as the sole diluent, grams/liter copper loading values were depressed (2.19 g/l as versus 3.16 g/l for the system having no added nonyl phenol) but the degree of modification values were substantially the same for nonylphenol additions of 25, 50, and 100 grams/liter.

In view of the above, reagents comprehended by the present invention are seen to comprise mixtures of one or more hydroxy aryl ketoxime extractants of Formulas I and/or II with one or more hydroxy aryl aldoxime extractants of Formula III, with ketoxime to aldoxime molar ratios of from 1:100 to 100:1. The reagents further comprise from 0 to 20 mole percent of a kinetic additive based on ketoxime content. The reagents also comprise a modifier of extraction and stripping in an amount providing a degree of modification of the aldoxime constituent of from about 0.75 to 1.0. Among the reagents comprehended by the present invention, therefore, are reagents which consist of a mixture of specified aldoxime and ketoxime extractants and which include neither a kinetic additive (i.e., 0 mole percent kinetic additive based on ketoxime content) nor an added equilibrium modifier (i.e., a modifier content providing a degree of modification of 1.0).

Comprehended by the present invention are processes for recovery of copper from an aqueous solution comprising: contacting the aqueous solution with an organic phase comprising a water immiscible organic solvent (such as liquid hydrocarbon) and a reagent as specified above wherein the degree of modification of aldoxime present is from about 0.75 to 1.0 to extract at least a portion of the copper values into the organic phase; separating the resultant copper-pregnant organic phase from the resultant copper-barren aqueous phase; and recovering copper values from the copper-pregnant organic phase. Processes of the present invention most advantageously further involve use of a kerosene solvent and stripping of copper values from the copper-pregnant organic phase by means of an acid. Aqueous solutions from which copper values may be recovered by processes are preferably acidic, having a pH of from about 0.5 to 7.0, but may also be basic.

The following examples 1 through 9 are provided for the purpose of illustrating reagents and processes of the invention. More particularly, the examples relate to reagent formulations individually including three different hydroxy aryl aldoximes of Formula III (5-octyl-, 5-nonyl-, and 5-dodecyl salicylaldoxime) and three different hydroxy aryl ketoximes of Formulas I and II (2-hydroxy-5-nonyl benzophenone oxime, 2-hydroxy-5-nonyl phenyl benzyl ketone oxime, and 2-hydroxy-5-nonyl phenyl methyl ketone oxime). In some examples, representative kinetic additives (5,8-diethyl-7-hydroxy-4-dodecan-6-oxime according to U.S. Pat. No. 3,224,873 and an alpha-beta-dioxime according to U.S. Pat. No. 4,173,616) are present and in some examples they are not included in the reagent. In some examples, representative equilibrium modifiers (tridecanol, dodecylphenol) are present while in other examples no equilibrium modifier is present beyond small quantities of phenolic starting materials remaining as a residue in aldoxime stocks. Certain examples provide experimental data indicating highly advantageous net copper transfer properties for the reagents and certain others indicate advantageous kinetic properties.

In each illustrative example of the present invention, experimental data establish significant departures in properties of reagents from the properties which would be predicted for the reagents based upon characteristics of the component hydroxy aryl ketoxime and hydroxy aryl aldoxime extractants. To further illustrate the present invention, examples 10 through 13 relate to reagent formulations outside the scope of the present invention are provided. Example 14 is illustrative of that aspect of the present invention which comprises novel methods of formulating reagents wherein use of predetermined quantities of kinetic additives (with ketoxime extractants) or use of predetermined quantities of equilibrium modifiers (with aldoxime extractants) is avoided but desired kinetic and equilibrium conditions are nonetheless secured. Example 15 is illustrative of advantages of reagents of the invention in the context of avoidance of formation of "crud" during continuous solvent extraction processing of copper-bearing leach liquors.

EXAMPLE 1

This example relates to the properties of two extractant solutions (and reagents comprising mixtures of the solutions) wherein the active extractant chemical of one solution is a ketoxime of Formula I and the active extractant of the other is an aldoxime of Formula III. The reagent solutions tested were: (1) a 32 v/v percent solution of LIX$^R$64N (0.36 molar in 2-hydroxy-5-nonyl benzophenone oxime and 0.0225 molar in 5,8-diethyl-7-hydroxydodecan-6-oxime) in Escaid 100; and (2) a 20 v/v percent solution of 2-hydroxy-5-nonyl benzaldoxime (0.32 molar and prepared using a 94% pure stock oxime) in Escaid 100. The respective solutions and mixtures thereof in volume/volume ratios of 90/10, 80/20, 70/30, 60/40, 50/50, 40/60, 30/70, 20/80, and 10/90 were equilibrated with a solution containing 180 g/l sulfuric acid and 30 g/l $Cu^{+2}$ by three separate, three minute agitated contacts with fresh solution employed for each contact. The respective equilibrated stripped organics were then filtered and a portion of each sampled for analysis before the remainder was equilibrated with an aqueous copper sulfate solution containing 5.4 g/l $Cu^{+2}$, 1.0 g/l ferric ion at a pH of 1.90 using a vigorous three minute contact at O/A=1/1. The respective organic and aqueous phases were then analyzed. The results are shown in Table IV below and indicate significant departures in copper extraction properties for the mixed reagents from those properties predicted on the results obtained for the unmixed extractant solutions.

TABLE IV

| Solution Ratio #1/#2 | Stripped Organic Actual (Predicted) | Loading O/A = 1/1 | |
|---|---|---|---|
| | | Organic Actual/ (Predicted) | Aqueous Actual/ (Predicted) |
| 100/0 | 0.20 | 4.38 | 1.39 |
| 90/10 | 0.47 (0.74) | 4.63 (4.97) | 1.17 (1.34) |
| 80/20 | 0.65 (1.28) | 4.99 (5.56) | 1.07 (1.28) |
| 70/30 | 1.07 (1.81) | 5.64 (6.16) | 0.91 (1.22) |
| 60/40 | 1.37 (2.35) | 5.91 (6.75) | 0.82 (1.17) |
| 50/50 | 1.94 (2.89) | 6.75 (7.34) | 0.75 (1.12) |
| 40/60 | 2.35 (3.43) | 6.93 (7.93) | 0.69 (1.06) |
| 30/70 | 2.95 (3.97) | 7.59 (8.52) | 0.65 (1.00) |
| 20/80 | 3.64 (4.50) | 8.33 (9.12) | 0.67 (0.95) |
| 10/90 | 4.42 (5.04) | 9.09 (9.77) | 0.71 (0.90) |
| 0/100 | 5.58 | 10.30 | 0.84 |

EXAMPLE 2

This example relates to properties of two extractant solutions (and reagent mixtures of these solutions) wherein the active extractant in one is a ketoxime of Formula I and the active extractant of the other is an aldoxime of Formula III. The solutions tested were: (1) a 19.2 v/v percent solution of SME 530 (0.36 molar in 2-hydroxy-5-nonylphenyl methyl ketone oxime and approximately 0.02 molar in an alpha-beta-dioxime of the type illustrated in Example III of U.S. Pat. No. 4,173,616); and (2) a 2-hydroxy-5-nonyl benzaldoxime solution as in Example I. Experimental data set out in Table V below indicates significant departures in properties of mixed solution reagents as compared to those predicted on the basis of properties of unmixed solutions.

TABLE V

| Solution Ratio #1/#2 | Stripped Organic Actual (Predicted) | Loading O/A = 1/1 | |
|---|---|---|---|
| | | Organic Actual/ (Predicted) | Aqueous Actual/ (Predicted) |
| 100/0 | 0.25 | 4.66 | 1.13 |
| 90/10 | 0.44 (0.75) | 4.89 (5.20) | 1.03 (1.09) |
| 80/20 | 0.71 (1.25) | 5.28 (5.75) | 0.91 (1.05) |
| 70/30 | 1.04 (1.76) | 5.79 (6.30) | 0.78 (1.01) |
| 60/40 | 1.44 (2.27) | 6.24 (6.84) | 0.71 (0.97) |
| 50/50 | 1.94 (2.78) | 6.81 (7.38) | 0.65 (0.94) |
| 40/60 | 2.33 (3.30) | 7.34 (7.93) | 0.60 (0.90) |
| 30/70 | 2.91 (3.80) | 7.92 (8.48) | 0.56 (0.86) |
| 20/80 | 3.66 (4.31) | 8.58 (9.02) | 0.57 (0.82) |
| 10/90 | 4.40 (4.82) | 9.34 (9.56) | 0.62 (0.78) |
| 0/100 | 5.33 | 10.11 | 0.74 |

EXAMPLE 3

Example 1 was repeated using an hydroxy phenyl benzyl ketone oxime of Formula I (an 18 v/v percent solution Acorga p-17 reagent which contains about 60 weight/weight percent 2-hydroxy-5-nonyl phenyl benzyl ketone oxime in Kerman 627) in place of the indicated benzophenone oxime.

TABLE VI

| Solution Ratio #1/#2 | Stripped Organic Actual (Predicted) |
|---|---|
| 100/0 | 0.12 |
| 50/50 | 1.71 (2.60) |
| 0/100 | 5.09 |

EXAMPLE 4

Example 1 was repeated but using a different hydroxy aryl aldoxime of Formula III in place of the aldoxime indicated. The aldoxime solution employed (No. 2) was a 20 v/v percent solution of 2-hydroxy-5-dodecyl benzaldoxime (0.32 molar) and 0.063 molar in dodecylphenol in Escaid 100. Experimental data obtained are set out in Table VII below.

TABLE VII

| Solution Ratio #1/#2 | Stripped Organic Actual (Predicted) | Loading O/A = 1/1 | |
|---|---|---|---|
| | | Organic Actual/ (Predicted) | Aqueous Actual/ (Predicted) |
| 100/0 | 0.31 | 4.62 | 1.67 |
| 90/10 | 0.49 (0.73) | 5.20 (5.07) | 1.43 (1.59) |
| 80/20 | 0.74 (1.14) | 5.47 (5.52) | 1.28 (1.52) |
| 70/30 | 1.08 (1.56) | 5.84 (5.98) | 1.19 (1.44) |
| 60/40 | 1.48 (1.98) | 6.28 (6.43) | 1.08 (1.37) |
| 50/50 | 1.83 (2.40) | 6.62 (6.88) | 1.00 (1.29) |
| 40/60 | 2.37 (2.81) | 7.11 (7.33) | 0.94 (1.21) |
| 30/70 | 2.82 (3.23) | 7.62 (7.78) | 0.93 (1.14) |
| 20/80 | 3.39 (3.65) | 8.08 (8.24) | 0.91 (1.06) |
| 10/90 | 3.82 (4.06) | 8.55 (8.69) | 0.92 (0.99) |
| 100/0 | 4.48 | 9.14 | 0.91 |

EXAMPLE 5

Example 1 was repeated using an aldoxime solution (in Escaid 100) which was 0.32 molar in 2-hydroxy-5-nonyl benzaldoxime and 0.10 molar in tridecanol. Experimental data obtained are set out in Table VIII below.

TABLE VIII

| Solution Ratio #1/#2 | Stripped Organic Actual(Predicted) | Loading O/A = 1/1 | |
|---|---|---|---|
| | | Organic Actual/ (Predicted) | Aqueous Actual/ (Predicted) |
| 100/0 | 0.19 | 4.26 | 1.43 |
| 90/10 | 0.37 (0.57) | 4.61 (4.71) | 1.26 (1.35) |
| 80/20 | 0.60 (0.93) | 4.97 (5.16) | 1.16 (1.27) |
| 70/30 | 0.93 (1.30) | 5.36 (5.61) | 1.04 (1.19) |
| 60/40 | 1.28 (1.67) | 5.84 (6.06) | 0.93 (1.11) |
| 50/50 | 1.64 (2.04) | 6.27 (6.51) | 0.89 (1.04) |
| 40/60 | 1.99 (2.41) | 6.65 (6.95) | 0.77 (0.96) |
| 30/70 | 2.43 (2.78) | 7.20 (7.40) | 0.72 (0.88) |
| 20/80 | 2.84 (3.15) | 7.63 (7.85) | 0.67 (0.80) |
| 10/90 | 3.33 (3.52) | 8.16 (8.30) | 0.64 (0.72) |
| 100/0 | 3.89 | 8.75 | 0.64 |

EXAMPLE 6

Extractant solutions employed were: (1) a 0.36 molar solution of 2-hydroxy-5-nonyl benzophenone oxime in Escaid 100; and (2) a 0.32 molar solution of 2-hydroxy-5-nonyl benzaldoxime in Escaid 100. The individual solutions and reagent mixtures thereof were equilibrated with two acid copper solutions, one containing 180 g/l sulfuric acid and 30 g/l $Cu^{+2}$ and the other containing 150 g/l sulfuric acid and 30 g/l $Cu^{+2}$, by contacting each organic three times with the proper fresh aqueous solution for three minutes each contact. The respective stripped organics from the equilibration with the 180 g/l $H_2SO_4$, 30 g/l $Cu^{+2}$ contact were then contacted at an O/A of ½ with a copper sulfate solution containing 5.36 g/l Cu, 1 g/l $Fe^{+3}$, pH=1.9 for three minutes. The organic and aqueous phases were then analyzed and the data obtained are set out in Table IX below.

TABLE IX

| Solution Ratio #1/#2 | Stripped Organic Actual (Predicted) | | Loading O/A = 1/1 | |
|---|---|---|---|---|
| | 180 g/l $H_2SO_4$ | 150 g/l $H_2SO_4$ | Organic Actual/ (Predicted) | Aqueous Actual/ (Predicted) |
| 100/0 | 0.24 | 0.47 | 6.22 | 2.26 |
| 70/30 | 1.12 (1.77) | 2.04 (2.50) | 7.92 (7.71) | 1.82 (2.29) |
| 50/50 | 1.96 (2.79) | 3.32 (3.85) | 8.86 (8.70) | 1.76 (2.31) |
| 30/70 | 3.12 (3.80) | 4.80 (5.20) | 9.87 (9.69) | 1.85 (2.33) |
| 0/100 | 5.33 | 7.23 | 11.18 | 2.36 |

EXAMPLE 7

Extractant solutions employed were: (1) a 12.4 weight/volume percent solution of 2-hydroxy-5-nonyl benzophenone oxime (0.36 molar) in Exxon Aromatic 150; and (2) an 8.25 weight/volume percent solution of 2-hydroxy-8-octyl benzaldoxime (0.26 molar) in Exxon Aromatic 150. The aldoxime stock employed was prepared using a predominantly single isomeric form of octylphenol as a starting material and had a purity of 74%, with the balance of the stock predominantly octyl phenol starting material. Solutions and mixtures thereof were tested as in Example 1 and the stripped organic data obtained is set out in Table X below.

TABLE X

| Solution Ratio #1/#2 | Stripped Organic Actual (Predicted) |
|---|---|
| 100/0 | 0.18 |
| 70/30 | 0.84 (1.08) |
| 50/50 | 1.44 (1.68) |
| 30/70 | 2.08 (2.27) |

TABLE X-continued

| Solution Ratio #1/#2 | Stripped Organic Actual (Predicted) |
|---|---|
| 0/100 | 3.17 |

EXAMPLE 8

The organic solutions described in Example 6 were equilibrated with stripping solution as described in Example 1. 100 ml. of the respective filtered organic solution and 100 ml. of an aqueous solution containing 6.0 g/l $Cu^{+2}$, and 3.0 g/l $Fe^{+3}$ at a pH of 2.0 were carefully added to a 2¼ by 2¼ by 4 inch mixer box. Mixing at 1800 rpm's with a 1¼ inch impeller was started and samples of the emulsion removed at the indicated times. After the phases separated, the organic phase was filtered and analyzed for copper. The results are shown below.

TABLE XI

| | Solution No. 1 | | 50/50 mix | | Solution No. 2 | |
|---|---|---|---|---|---|---|
| Time | g/l Copper | % Equil. | g/l Copper | % Equil. | g/l Copper | % Equil. |
| 0 | 0.24 | | 1.96 | | 5.09 | |
| 30 | 3.12 | 66.3 | 6.42 | 88.3 | 9.42 | 96.7 |
| 60 | 3.70 | 77.2 | 6.76 | 95.0 | 9.47 | 97.8 |
| 300 | 4.72 | 100.0 | 7.01 | 100.0 | 9.57 | 100.0 |

The expected % equilibrium values for the 50/50 mix at 30 and 60 seconds are 80.5 and 87.5, respectively, thus the 50/50 mix extracts copper at a faster rate than expected.

EXAMPLE 9

The organic solutions described in Example 3 were studied kinetically using the method described in Example 8. The results are shown below.

TABLE XII

| | Solution No. 1 | | 50/50 mix | | Solution No. 2 | |
|---|---|---|---|---|---|---|
| Time | g/l Copper | % Equil. | g/l Copper | % Equil. | g/l Copper | % Equil. |
| 0 | 0.12 | | 1.71 | | 5.09 | |
| 30 | 2.68 | 66.1 | 5.93 | 87.7 | 9.42 | 96.7 |
| 60 | 3.21 | 79.8 | 6.26 | 94.6 | 9.47 | 97.8 |
| 300 | 3.99 | 100.0 | 6.52 | 100.0 | 9.57 | 100.0 |

The 30 and 60 second % equilibrium expected values for the 50/50 mix would be 81.4 and 88.8% respectively, thus the kinetics of the 50/50 mix are significantly faster than expected.

The following examples 10 through 13 provide an illustration of properties of reagent formulations which are outside the scope of the present invention.

EXAMPLE 10

This example relates to the properties of two extractant solutions (and of mixtures of these solutions) wherein the active extractant chemicals of both are hydroxy aryl ketoximes comprehended by Formulas I or II and wherein no hydroxy aryl aldoxime extractant of Formula III is included. The solutions tested were: (1) a 32 v/v percent solution of LIX$^R$64N (0.36 molar in 2-hydroxy-5-nonyl benzophenone oxime and 0.0225 molar in 5,8-diethyl-7-hydroxydodecan-6-oxime) in Escaid 100; and (2) a 19.2 v/v percent solution of SME 530 (as described in Example 2, above) in Escaid 100. Solutions were tested individually and as mixtures in volume/volume ratios of 70/30, 50/50, and 30/70 under the conditions and according to the procedures of Example 1. Stripped organic and raffinate values in grams/liter copper are set out in Table XIII below and indicate no significant departure in properties of the mixed solutions from those properties predicted on the basis of results for the individual solutions.

TABLE XIII

| | | Loading O/A = 1/1 | |
|---|---|---|---|
| Solution Ratio #1/#2 | Stripped Organic Actual (Predicted) | Organic Actual/ (Predicted) | Aqueous Actual/ (Predicted) |
| 100/0 | 0.22 | 4.48 | 1.40 |
| 70/30 | 0.24 (0.24) | 4.57 (4.59) | 1.34 (1.32) |
| 50/50 | 0.25 (0.25) | 4.65 (4.66) | 1.32 (1.28) |
| 30/70 | 0.27 (0.26) | 4.71 (4.73) | 1.25 (1.22) |
| 0/100 | 0.28 | 4.84 | 1.15 |

EXAMPLE 11

This example relates to properties of two extractant solutions (and of mixtures of these solutions) wherein the active extractant in one is an hydroxy aryl aldoxime of Formula III and the active extractant of the other is an hydroxy aryl ketoxime not comprehended by Formulas I and II. The solutions tested were: (1) a 31 v/v percent solution of LIX$^R$70 (0.35 molar in 2-hydroxy-3-chloro-5-nonyl benzophenone oxime and 0.0218 molar in Escaid 100); and (2) a 20 v/v percent solution of 94 percent active 2-hydroxy-5-nonyl benzaldoxime (0.32 molar) in Escaid 100. Solutions were tested individually and as mixtures in volume/volume ratios of 70/30, 50/50, and 30/70 under conditions and according to the procedures of Example 1. Stripped organic values in grams/liter copper are set out in Table XIV below and indicate no significant departure from those properties predicted on the basis of results for individual solutions.

TABLE XIV

| Solution Ratio #1/#2 | Stripped Organic Actual (Predicted) |
|---|---|
| 100/0 | 5.83 |
| 70/30 | 5.68 (5.66) |
| 50/50 | 5.55 (5.55) |
| 30/70 | 5.43 (5.44) |
| 0/100 | 5.27 |

EXAMPLE 12

This Example republishes experimental results reported in Tumilty, et al., [*Adv. in Extractive Metallurgy Int'l. Symp.*, 3rd, pp. 123–131, 1977 (London)] for use of two reagents (and mixtures thereof) wherein the active extractant chemical in one was an hydroxy aryl ketoxime according to Formula I and the active extractant of the other was an hydroxy aryl aldoxime comprehended by Formula III, but wherein the equilibrium modifier content was such as provided a degree of modification for the aldoxime which was less than 0.60. The reagent solutions tested were: (1) 25 v/v percent solution of LIX$^R$64N (0.28 molar in 2-hydroxy-5-nonyl benzophenone oxime and 0.0176 molar in 5,8-diethyl-7-hydroxy dodecan-6-oxime); and (2) a 25 v/v percent solution of Acorga P-5300 (0.225 molar in 2-hydroxy-5-nonyl benzaldoxime and 0.80 molar in nonylphenol modifier) in Escaid 100. Reagent solutions were reported to have been tested individually and as mixtures in volume/volume ratios of 75/20, 50/50, and 25/75 under specified conditions. Stripped organic values from Table 4 of the publication are set out in Table XV below and indicate no significant departure in properties of the mixed solutions from those properties predicted on the basis of results for the individual solutions.

TABLE XV

| Solution Ratio #1/#2 | Stripped Organic Actual (Predicted) |
|---|---|
| 100/0 | 0.50 |
| 75/25 | 0.75 (0.78) |
| 50/50 | 1.00 (1.05) |
| 25/75 | 1.30 (1.32) |
| 0/100 | 1.60 |

It is additionally noteworthy that Table 4 of the publication reports a series of variations in extraction stage efficiencies for above noted solution mixtures which are precisely linear (86.0, 87.5, 89.0, 90.5, and 92.0 percent) indicating no departure in kinetic properties of the mixed solutions from those predicted on the basis of kinetic characterisitics of the individual reagents.

EXAMPLE 13

This example republishes experimental results reported by Ritcey, et al., in CIM Bulletin, pp. 87-92, February, 1974, for use of two reagents (and mixtures thereof) wherein the active extractant chemical in one was an hydroxy aryl ketoxime according to Formula I and the active extractant of the other was an hydroxy quinoline compound. The reagent solutions tested were: (1) a 7 v/v percent solution of LIX$^R$64N (0.079 molar in 2-hydroxy-5-nonyl benzophenone oxime and 0.005 molar in 5,8-diethyl-7-hydroxydodecan-6-oxime) in Escaid 100; and (2) a 7 v/v percent solution of Kelex 100 (0.175 molar in 7-[3-(5,5,7,7-tetramethyl-1-octenyl)] in Escaid 100. Reagent solutions were reported to have been tested individually and as mixtures in volume/volume ratios of 10/90, 30/70, 50/50, 70/30, and 90/10 under specified conditions. Loaded organic values from FIG. 2 of the publication are set out in Table XVI below and indicate no significant departure in properties predicted on the basis of results for individual solutions.

TABLE XVI

| Solution Ratio #1/#2 | Loaded Organic* Actual (Predicted) |
|---|---|
| 100/0 | 1.70 |
| 90/10 | 2.10 (2.00) |
| 70/30 | 2.66 (2.66) |
| 50/50 | 3.45 (3.40) |
| 30/70 | 4.05 (4.05) |
| 10/90 | 4.80 (4.75) |
| 0/100 | 5.20 |

*Estimated from graphic display of data points.

EXAMPLE 14

This example illustrates that aspect of the present invention which provides novel and highly beneficial new methods for the formulation of reagents for use in continuous solvent extraction processes for recovery of copper under specified conditions of equilibrium and kinetics. As previously noted, effective use of "strong" aldoximes as the sole extractant chemical in copper extraction reagents has required that specified molar quantities of one or another equilibrium modifier substance be employed. These substances shift the overall equilibrium of the entire extraction and stripping process so that stripping at lower acidities is facilitated and the overall efficiency of the solvent extraction process is improved. According to the present invention, it is possible to secure desired alterations in equilibrium characteristics of systems employing strong aldoxime extractants while diminishing the adverse effects of equilibrium modifier usage. This result is obtained by formulating the aldoxime-containing reagent to incorporate ketoxime extractant substances (in mole ratios ranging from 100:1 to 1:100) and refraining from incorporating some or all of the equilibrium modifier that would ordinarily be needed to bring about the desired equilibrium conditions if the aldoxime alone were used.

Evidence of the successful application of the above-noted formulation procedures is provided by the test results set forth, for example, in the foregoing Examples 1 and 5 herein and the data set forth in corresponding Tables IV and VIII. These two examples represent duplicate procedures wherein the sole experimental variable was incorporation with the aldoxime of a tridecanol modifier. A comparison of the copper contents of the aqueous samples cited in Tables IV and VIII respectively, is set out in Table XVII below. The comparison reveals that the amount of copper extracted [as represented by the amount of copper originally present in the aqueous copper feed solution (5.4 g/l) minus the amount remaining (the value from the respective Table)], is equal or greater for all ratios of the ketoxime to aldoxime from 90/10 through 20/80 in the absence of modifier (Example 1) than in the presence of modifier (Example 5) provided the same ketoxime/aldoxime ratio is compared. Hence, under the conditions of this experiment, essentially equal copper extraction is realized in the absence of added tridecanol.

TABLE XVII

| Solution Ratio No. 1/No. 2 | Copper Extracted (g/l) | |
|---|---|---|
| | Without Modifier | With Modifier |
| 100/0 | 4.01 | 4.05 |
| 90/10 | 4.23 | 4.22 |
| 80/20 | 4.33 | 4.32 |
| 70/30 | 4.49 | 4.44 |
| 60/40 | 4.58 | 4.55 |
| 50/50 | 4.65 | 4.59 |
| 40/60 | 4.71 | 4.71 |
| 30/70 | 4.75 | 4.76 |
| 20/80 | 4.73 | 4.81 |
| Aqueous Feed | 5.40 | 5.48 |

As also previously noted, effective use of ketoximes as the sole extractant in copper extraction reagents has generally required that specified molar quantites of kinetic additives be employed. These substances serve to alter the overall copper transfer rates so that the extraction and stripping processes can be accomplished in substantially less time in the same equipment. Studies of the kinetics of copper solvent extraction reactions using ketoximes with and without additives are provided in the prior art. Among the most extensively studied systems have been those wherein 2-hydroxy-5-nonyl benzophenone oxime extractant (i.e., LIX$^R$65) is combined with specified quantities of the alpha hydroxy oxime kinetic additive, 5-8-diethyl-7-hydroxydodecan-6-one (i.e., LIX$^R$63), to allow attainment of desired kinetic conditions not attainable through use of the ketoxime alone. See, e.g., Glett, et al., J. Inorg. Nucl. Chem., 35, pp. 2471-2487 (1973); Whewall, et al., J. Inorg. Nucl. Chem., 38, pp. 2071-2075 (1976); and Preston, J. Inorg. Nucl. Chem., 42, pp. 441-447 (1980).

Of particular interest to the present invention are studies of kinetic characteristics of LIX$^R$64N reagent which, as reported by Preston, supra, comprises 2-hydroxy-5-nonyl benzophenone oxime and 5,8-diethyl-7-hydroxydodecan-6-one in a ratio of 20:1 by weight. As one example, equilibrium characteristics of LIX$^R$64N are discussed in the context of comparison with LIX$^R$34 (a non-ketoxime extractant) in Kordosky, et al., "A New Generation of Copper Extractant" A.I.M.E. Annual Meeting, Las Vegas, Nev., Feb. 22, 1976. The publication relates to equilibration test procedures using the reagent in the treatment of sample aqueous solutions (containing 4 g/l Cu$^{+2}$, 4 g/l Fe$^{+3}$ at a pH of 1.9) which are quite analogous to those employed in Example 8 herein. The reagent and solution samples were noted to have been admixed in a 2½×2½×4 inch mixer box stirred by a 1¼ inch impeller at 2000 rpm, with specimens being removed periodically for organic phase copper analysis. The results of these studies revealed achievement of a desired 95% approach to equilibrium in 40 seconds for the ketoxime extractant when combined with the kinetic additive. Comparison of this equilibrium data of procedurally analogous Example 8 herein reveals achievement of a 95% approach to equilibrium in 60 seconds for the 2-hydroxy-5-nonyl benzophenone oxime extractant without resort to use of any kinetic additive at all and despite the use of an impeller operating at a 10 percent slower speed. This desirable result, of course, attends formulation of the reagent according to the invention as a composite reagent of the selected ketoxime along with a selected aldoxime (i.e., 2-hydroxy-5-nonyl benzaldoxime) in a 50/50 ratio.

As a further illustration of improved reagent formulation processes of the present invention, a kinetic study was conducted using the following 3 reagent compositions thereof:

Reagent A: 0.18M 2-hydroxy-5-nonyl benzophenone oxime and 0.0113M 5,8-diethyl-7-hydroxydodecan-6-one in Kermac 500T Reagent B: 0.18M 2-hydroxy-5-nonyl benzophenone oxime in Kerman 500T.

Reagent C: 0.18M 2-hydroxy-5-dodecyl benzaldoxime in Kerman 500T.

Kinetic property determinations were carried out essentially according to the procedures of Example 8, except that a stirring speed of 1650 rpm was employed. The formulations tested included Reagents A and B alone, a 50/50 mixture of Reagents B and C, and a 25/25/50 mixture of Reagents A, B, and C. Copper content and % equilibrium values determined for the four test reagents are set out in Table XVIII below.

Viewed in the context of the improved formulation processes of the invention, the data of Table XVIII reveal that in the event a reagent formulator would desire to employ a selected benzophenone oxime extractant but would incorporate a given molar quantity of kinetic additive to achieve desired kinetic characteristics [Compare, e.g., the 60 second percent approach to equilibrium values for Reagent B (without kinetic additive) and Reagent A (with kinetic additive)], comparable kinetic properties can be achieved through use of less kinetic additive (e.g., in the 25/25/50 mix of Reagents A, B, and C) or even no kinetic additive at all (e.g., the 50/50 mix of Reagents B and C) provided that a selected aldoxime extractant is incorporated in the reagent formulation.

TABLE XVIII

| Time | Reagent A | | Reagent B | | 50/50 Mix Regent B & C | | 25/25/50 Mix Reagents A, B & C | |
|---|---|---|---|---|---|---|---|---|
| | g/l Copper | % Equil. | g/l Copper | % Equil. | g/l Copper | % Equil. | g/l Copper | % Equil. |
| 0 | 0 | — | 0 | — | 0 | — | 0 | — |
| 30 | 2.75 | 85 | 2.01 | 63 | 3.38 | 78 | 3.52 | 84 |
| 60 | 3.08 | 95 | 2.33 | 73 | 3.80 | 88 | 3.96 | 95 |
| 300 | 3.24 | 100 | 3.19 | 100 | 4.31 | 100 | 4.17 | 100 |

EXAMPLE 15

This example illustrates the significant advantage of reagents of the invention in the context of avoidance of "crud" formation in continuous solvent extraction processes for the recovery of copper values.

A series of circuits were run in order to compare the crud formation properties of the following four reagent formulations diluted in kerosene solvent: Reagent No. 1, LIX$^R$64N; Reagent No. 2, LIX$^R$6022; Reagent No. 3, Acorga PT 5050; and Reagent No. 4, a 50/50 volume mixture of LIX$^R$64N and 5-dodecylsalicylaldoxime.

In the first phase of testing two independent one extraction-one strip circuits, identical in every way except for the copper extraction reagent, were run. In this phase of testing, Reagent No. 4 was compared to Reagent No. 2 and then to Reagent No. 3. The circuits were operated for six to eight hours per day and readings taken every half hour. Data on the following were recorded: phase bands, mixer continuity, tempeature, aqueous entrainment in the loaded organic and stripped organic phases, and organic entrainment in the raffinate and pregnant electrolyte. One of the important observations made was that it appeared that much less crud was generated in the Reagent No. 4 circuit than in either of the other (LIX 6022 or PT-5050) circuits.

A second phase of testing was designed to quantify the amount of crud generated when comparing Reagent No. 4 with Reagent No. 1 and Reagent No. 3. Three single stage circuits were run side by side wherein loaded organic was continually contacted with fresh aqueous leach from a common source. After 16 hours of operation, the circuits were shut down and each settler carefully emptied into a large separatory funnel. The crud layer for each circuit was isolated, transferred to a Goetz tube and centrifuged at 2000 rpm for ten minutes. The volume of the compacted crud is shown in Table XIV, below. The amount of crud generated by the Reagent No. 3 circuit was four fold greater than the amount generated by the Reagent No. 1 circuit and three times greater than the amount generated in the Reagent No. 4 circuit. While the absolute amount of compacted crud generated was not very large, the volume occupied by the non-compacted crud in the circuit was 5-10 times greater.

TABLE XIX

| Organic | Compacted Crud (ml) |
|---|---|
| 9.5 v/v % Reagent No. 3 | 30–33 |
| 9.5 v/v % Reagent No. 4 | 10–11 |
| 10.5 v/v % Reagent No. 1 | 7–8 |

In an effort to determine whether or not the addition of the modifiers nonylphenol (NP) and tridecanol (TDA) to unmodified reagents would accelerate crud formation, the following tests were run. Two circuits were set up, each consisting of one extraction and one strip stage in a manner similar to the first phase of testing. Each test was run for a total of 10 hours, 5 hours with leach solution at ambient temperature (29°–32° C.) and 5 hours with the leach solution cooled (16°–18° C.). At the end of a given circuit run, the crud layers were isolated and centrifuged as previously described. The results are shown in Table XX, below. Note that the amount of compacted crud formed in the presence of added modifier is twice the amount formed when no modifier is added. Furthermore, the crud generated in the presence of modifiers had a much greater tendency to float in the organic phase resulting in easier crud movement to the strip stage in the circuit.

TABLE XX

| REAGENT | CIRCUIT HOURS | COMPACTED CRUD (ml.) |
|---|---|---|
| 10.5 v/v % Reagent No. 1 | 9.5 | 5 |
| 10.5 v/v % Reagent No. 1 + 2.5 v/v % TDA | 9.5 | 10 |
| 8.5 v/v % Reagent No. 4 | 8.0 | 10 |
| 8.5 v/v % Reagent No. 4 + 2.5 v/v % TDA | 8.0 | 20 |
| 8.5 v/v % Reagent No. 4 | 10.0 | 7 |
| 8.5 v/v % Reagent No. 4 + 3.0 v/v % NP | 10.0 | 14 |

EXAMPLE 16

Example 2 was repeated using as the ketoxime a purified 2-hydroxy-5-nonylphenyl methyl ketone oxime (0.36 molar), with no alpha-beta-dioxime; and as the benzaldoxime, 2-hydroxy-5-dodecyl benzaldoxime (0.32 molar), both dissolved in kerosene (Kerman 500T). The respective reagents and mixtures thereof were equilibrated by three separate, three minute agitated contacts with an electrolyte containing 182.0 g/l $H_2SO_4$ and 30.1 g/l $Cu^{+2}$. The respective stripped organics were equilibrated at an O/A=1/1 with an aqueous copper sulfate solution containing 5.6 g/l $Cu^{+2}$ and 1.0 g/l ferric ion at a pH of 1.9 using a vigorous three minute contact. The results can be seen from Table XXI below.

TABLE XXI

| | | Loading O/A = 1/1 | |
|---|---|---|---|
| Solution Ratio #1/#2 | Stripped Organic Actual (Predicted) | Organic Actual/ (Predicted) | Aqueous Actual/ (Predicted) |
| 100/0 | .37 | 5.06 | .92 |
| 90/10 | .68 (.85) | 5.48 (5.57) | .83 (.92) |
| 80/20 | 1.02 (1.33) | 5.92 (6.08) | .79 (.92) |
| 70/30 | 1.48 (1.81) | 6.27 (6.59) | .73 (.92) |
| 60/40 | 1.99 (2.29) | 6.79 (7.10) | .68 (.92) |
| 50/50 | 2.37 (2.77) | 7.33 (7.61) | .69 (.92) |

TABLE XXI-continued

| | | Loading O/A = 1/1 | |
|---|---|---|---|
| Solution Ratio #1/#2 | Stripped Organic Actual (Predicted) | Organic Actual/ (Predicted) | Aqueous Actual/ (Predicted) |
| 40/60 | 2.94 (3.24) | 7.88 (8.11) | .67 (.92) |
| 30/70 | 3.47 (3.72) | 8.46 (8.62) | .72 (.92) |
| 20/80 | 4.03 (4.20) | 9.00 (9.13) | .76 (.92) |
| 10/90 | 4.62 (4.68) | 9.62 (9.64) | .84 (.92) |
| 0/100 | 5.16 | 10.15 | .92 |

Numerous modifications and variations in practice of the invention as described in the above illustrative examples are expected to occur to those skilled in the art. As one example, while the foregoing Examples 1 through 9 illustrate reagents of the invention comprising mixtures of a single hydroxy aryl ketoxime extractant and a single hydroxy aryl aldoxime, reagents comprising more than one ketoxime and/or more than one aldoxime are centainly contemplated. Consequently, only such limitations as appear in the appended claims should be placed on the invention.

What is claimed is:

1. A reagent composition comprising a mixture of a substantially pure 2-hydroxy-5-nonyl phenyl methyl ketone oxime containing no kinetic additive or modifier and an aldoxime selected from the group consisting of 2-hydroxy-5-heptyl benzaldoxime, 2-hydroxy-5-octyl benzaldoxime, 2-hydroxy-5-nonyl benzaldoxime, and 2-hydroxy-5-dodecyl benzaldoxime.

2. An extraction reagent consisting essentially of a mixture of a substantially pure 2-hydroxy-5-nonyl phenyl methyl ketone oxime and 2-hydroxy-5-nonyl benzaldoxime.

3. An extraction reagent consisting essentially of a mixture of a substantially pure 2-hydroxy-5-nonyl phenyl methyl ketone oxime and 2-hydroxy-5-dodecyl benzaldoxime.

4. A process for recovery of copper from an aqueous solution comprising:
   (1) contacting the aqueous solution with an organic phase comprising a water immiscible solvent and a reagent composition according to claim 1, to extract at least a portion of the copper values into the organic phase;
   (2) separating the resultant copper-pregnant organic phase from the resultant copper-barren aqueous phase; and
   (3) recovering copper values from the copper-pregnant organic phase.

5. A process according to claim 4 wherein the water immiscible organic solvent is kerosene.

6. A process according to claim 4 wherein the step of recovering copper values comprises stripping copper values from the copper-pregnant organic phase by means of an acid.

7. A process according to claim 4 wherein the aqueous solution from which copper is recovered has a pH of from 0.5 to 7.0.

* * * * *